Reissued Jan. 12, 1954 Re. 23,766

UNITED STATES PATENT OFFICE 23,766

METAL ION CHELATING COMPOUNDS CONSISTING OF MONOPHENYL POLYALKYLENE POLYAMINO POLYCARBOXYLIC ACIDS AND SALTS

Frederick C. Bersworth, Verona, N. J.

No Drawing. Original No. 2,624,756, dated January 6, 1953, Serial No. 193,541, November 1, 1950. Application for reissue August 17, 1953, Serial No. 374,836

6 Claims. (Cl. 260—518)

Matter enclosed in heavy brackets [ ] appears in the original patent but forms no part of this reissue specification; matter printed in italics indicates the additions made by reissue.

This invention relates to chelating compounds for metal ions in aqueous solution and has for its object the provision of a chelating compound consisting of a mono phenyl poly alkylene polyamino polycarboxylic acid or salt thereof.

Another object is to provide a germicidally active metal ion chelating compound or agent for use in aqueous solutions having a wide range in pH values.

Still another object is to provide a germicidally active metal ion chelating compound or agent for use in alkaline pH solutions.

Other objects will be apparent as the invention is more fully hereinafter disclosed.

In accordance with these objects I have discovered that when one of the amino hydrogens of an alkylene polyamine is displaced by a phenyl group and the remaining hydrogens are displaced by acetic acid or its equivalent carboxylic groups, the resultant phenyl substituted alkylene polyamine polyacetic acid is water soluble and is a good chelating compound or agent for metal ions in aqueous solutions having an acid, alkaline and neutral pH is particularly effective as a chelating compound or agent in alkaline and neutral pH solutions towards alkaline earth metals and magnesium ions. In addition to being a chelating agent for metal ions over a wide pH range the halogenated mono phenyl polyacetic acid is an excellent bactericidal and fungicidal agent when both hydroxyl and halogen are present in the phenyl radical.

These properties give a wide field of utility for the compound in all types of acid, neutral and alkaline pH solutions containing detergents and acid and alkali soap compounds, as one skilled in the art will recognize. The aromatic or phenyl groups add compatibility of this chelating amino acid to solid soap compounds, i. e., bar soap.

The compounds of the present invention fall under the generic structural formula:

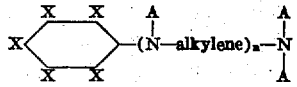

wherein X represents one of the group consisting of hydrogen, hydroxyl, alkyl, alkoxyl and halogen, with at least one X but not all of the X groups being halogen; A represents acetic or propionic acid *and alkali metal, ammonium and amine salts thereof*; n is a positive integer selected from the group consisting of 1 to 5; and alkylene represents ethylene, propylene or trimethylene.

In this type of compound, all of the A groups on the amino nitrogens function as salt-forming groups but only two of the A groups function as chelate-forming groups, one of which is that on the terminal amino nitrogen remote from the nitrogen to which is attached the phenyl substituent group and the other on the next adjacent interiorly spaced amino nitrogen. This leaves the remaining A groups to function as solubilizing groups for the compound in acid and alkali pH solutions.

In general, with increase in n from 1 to 5 the chelate-forming properties increase as well as the solubilities of the compound and the salts and chelates of the compound. However, as the compounds derived from ethylene diamine are the easiest to prepare and the easiest to define structurally these will be described by way of example but not by way of limitation, as one skilled in the art will perceive.

In the preparation of this series of compounds several alternative practices are available. As one example the production of the mono-substituted [p-nitro-chlorobenzyl ethylene diamine triacetic] *p - nitrophenylethylenediaminetriacetic* acid (sodium salt) will be described.

Example I

One mole of p-nitrochlorobenzene is added to a large excess of ethylene diamine and is heated under pressure in sealed containers to a temperature of about 120–140° C. for an extended period of time for 7 to 10 hours. The amount of excess ethylene diamine is from 2 to 4 moles. The reaction solution is then placed under a reflux condenser and heated to its refluxing temperature and caustic alkali solution is added in an amount required to neutralize the halide acid present in the reaction solution to slight excess. The excess ethylene diamine is then distilled off together with some water and the precipitated sodium chloride is filtered from the hot liquids remaining. The nitro benzene derivative of the ethylene diamine forms an insoluble upper layer on cooling slightly and can be separated from the aqueous solution remaining. This insoluble layer is extracted with nitro-benzene in which the disubstituted ethylene diamine compound is soluble and the mono-substituted compound is insoluble. The insoluble mono-substituted compound is then suspended in water in which it is slightly soluble and is carboxy-methylated by the chloracetic process using 3 moles of chloracetic acid sodium salt per mole of mono-substituted compound and the carboxymethylated amino acid is recovered from the reaction solution by acidifying the solution with HCl to a pH of about 2 at which the mono-substituted ethylene diamine tri-acetic acid precipitates. The mono-substituted compound also may be carboxymethylated in accordance with the process of my prior Patents Nos. 2,387,735, 2,407,645 and 2,461,519, by appropriate additions of sodium cyanide and formaldehyde, i. e., one molar weight of each for each amino hydrogen to be replaced, while maintaining a reaction temperature of about 95°–100° C. and while vigorously agitating the solution and excluding atmospheric gases from the solution by maintaining a low positive pressure of gaseous ammonia over the surface of the solution.

After the carboxymethylation reaction has been completed the reaction mixture is heated gradually to 100°–110° C. and freed of any contained ammonia, such as by passing steam therethrough, and after cooling to room temperature the polyamino acid may be obtained by neutralizing the solution with a mineral acid, such as HCl, to a pH of about 2. Alternatively, the sodium salt of the amino acid may be recovered from the reaction solution by evaporating off the water of solution to crystallization of the sodium salt.

The mono-substituted [p-nitrophenyl ethylene diamine triacetic] *p-nitrophenylethylenediaminetriacetic* acid has only slight solubility in water.

The free amino acid has the following structural formula:

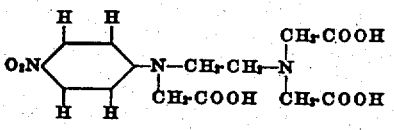

Each of the acetic acid groups are chemically reactive with any basic metal compound to form a metal salt and each said group functions as a solubilizing group in the compound. Two of the acetic acid groups, one on each amino nitrogen, function as chelate-forming groups, the chelate compound of a divalent metal such as copper being the easiest to illustrate structurally:

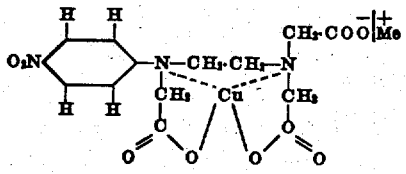

In this chelate compound the acetic acid salt group remains free to function as a solubilizing group in acid and alkaline pH solutions. In alkaline pH solutions Me represents an alkali metal, ammonium or an amine. In acid pH solutions Me is normally displaced by an acid hydrogen ion. The chelate compound of most divalent metals is most stable in alkaline pH solutions and is least stable in strongly acid pH solutions.

The [nitrobenzene] *nitrophenyl* group is a highly reactive group and may be separately reacted in a number of different ways to produce a plurality of chemically useful compounds.

For example, the $NO_2$ group on the aromatic nucleus may be reduced to an amino group, which may then be diazotized, and converted to a halogen by means of the Sandmeyer reaction. Also, the diazonium salt may be hydrolyzed to a phenolic group by well-known methods.

The amino hydrogens of the phenyl amino group may be substituted by various functional groups, such as acetic acid groups (by carboxymethylation as above described) to further modify the properties of the compound.

The aromatic group may also be further modified by substitution on the aromatic ring by known reactions to give derivatives thereof which are valuable chelating agents.

The aromatic nucleus also may be readily further chlorinated to introduce at least two more chlorine atoms therein. These chlorophenyl triacetic acid ethylene diamine compounds are generally insoluble in acid aqueous solutions having a pH of 1.5 to 2 and may be precipitated therefrom as the free acid. The various alkali metal, ammonium and amine salts of these chlorophenyl triacetic acid ethylene diamine compounds, however, are quite soluble in water and form chelate compounds with most divalent metal ions, particularly the alkaline earth metal and magnesium ions, which are stable in alkaline pH solutions.

In place of chlorine I may use bromine and/or iodine to form the respective halo analogues of the chlorine derivative above described.

Example II

In place of p-nitrochlorobenzene as the starting material of Example I, I have found that p-chlorotoluene may be employed. The original substitution reaction with ethylene diamine requires a higher temperature (120° C. under pressure) and a longer reaction time (10 hours), but the preparation is otherwise substantially the same. The main product after carboxymethylation has the formula:

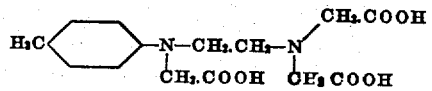

The aromatic ring may be then halogenated as described in Example I to introduce readily two halogens which are believed to go to positions ortho to the amino groups. For example, with chlorine the following compounds is believed to be formed:

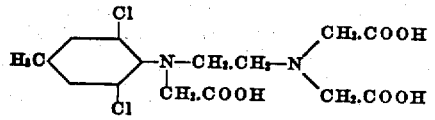

The isolation and properties are similar to those of the other compounds described.

Example III

The compound 2,4,6 trichloroaniline ethylene diamine triacetic acid may be prepared by heating one mole of 2,4,6 trichloroaniline with one mole of chloroethylamine diacetic acid $$(ClCH_2 \cdot CH_2 \cdot N(CH_2 \cdot COOH)_2)$$

in boiling aqueous alcohol under a refluxing condenser buffered to a neutral pH for an extended time interval with good agitation. After adjusting the pH of the solution to a pH of 10 to 10.5 with caustic alkali one mole of chloroacetic acid sodium salt is added to the solution and the solution is heated to 80°–85° C. for an extended time interval, usually about four (4) hours, to complete the substitution reaction.

The trisodium salt of the 2,4,6 trichlorophenyl ethylene diamine triacetic acid present in the reaction solution may be crystallized by slow evaporation of the reaction mixture to remove the water of solution to a concentration of 40% to 50% and allowing the salt to crystallize. Alternatively, the salt may be converted to the free acid by acidifying the solution with a strong mineral acid, preferably HCl, to a pH of about 2.0 at which the amino acid is in major part insolubilized.

Example IV

In place of ethylene diamine in Example I, propylene diamine may be employed in equivalent molar amount to form by the same procedure the p-chlorophenyl propylene diamine triacetic acid compound and salt.

Example V

In place of ethylene diamine in Example I, diethylene triamine may be employed in equivalent molar amounts to form by the same procedure the p-chlorophenyl diethylene triamine tetraacetic acid. In this example four molar equivalents each of sodium cyanide and formaldehyde are required in the carboxymethylation step.

This compound has greater solubility than the triacetic acid compounds due to the fourth carboxylic acid group and does not precipitate readily as the free acid on acidification to the precipitating pH of 2.0. It may also be converted to the acid by means of a weak cation resin (carboxylic acid type) and evaporating the solution slowly and filtering crystals as formed.

In the several examples given above, it is believed apparent to anyone skilled in the art that I may substitute any aliphatic alkylene polyamine for ethylene diamine without departure from the invention to form an analogous series of compounds and that, likewise I may substitute any other phenyl compound for phenyl compounds of the specific examples without departure from the invention to form an analogous series of compounds with ethylene diamine or any alkylene polyamine substituted therefor. In view thereof, the examples given are believed adequate for one skilled in the art to practice the invention in the production of these analogous compounds.

Likewise, it is believed apparent that the acetic acid substituent groups may be displaced in part or in whole by an analogue acid such as propionic acid without departure from the invention and that the term "alkylene" as it is employed in the generic description of the invention may be either ethylene, propylene or trimethylene without departure from the invention.

In view thereof all modifications and departures from the invention as hereinabove disclosed are contemplated as may fall within the scope of the following claims.

What is claimed is:

1. A compound conforming to the formula:

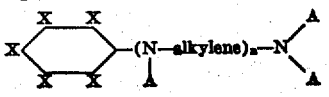

wherein alkylene is one of the group consisting of $$-CH_2\cdot CH_2-,\ -CH_2\cdot CH_2\cdot CH_2-,\ -CH(CH_3)\cdot CH_2-$$

n is a member of the group consisting of 1 to 5; A is one of the group consisting of $-CH_2\cdot COOH$ and $-CH_2\cdot CH_2\cdot COOH$ *and their alkali metal, ammonium and amine salts*; and X is one of the group consisting of hydrogen, hydroxyl, halogen, alkyl and alkoxyl with from one to three of the X groups being halogen.

2. The compound represented by the formula:

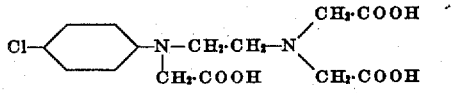

3. The compound represented by the formula:

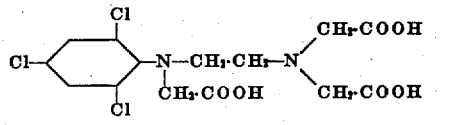

4. The compound represented by the formula:

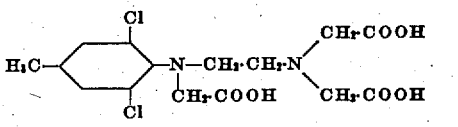

5. The compound represented by the formula:

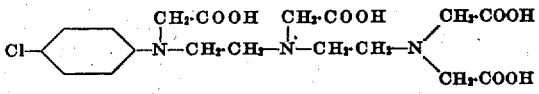

6. The compound represented by the formula:

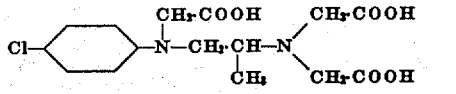

FREDERICK C. BERSWORTH.

References Cited in the file of this patent or the original patent

UNITED STATES PATENTS

| Number | Name | Date |
|---|---|---|
| 868,294 | Schmidlin | Oct. 5, 1907 |
| 2,195,974 | Reppe et al. | Apr. 2, 1940 |
| 2,489,363 | Bersworth | Nov. 29, 1949 |

FOREIGN PATENTS

| Number | Country | Date |
|---|---|---|
| 18,095 | Great Britain | of 1913 |
| 642,244 | Germany | Mar. 6, 1937 |

OTHER REFERENCES

Alphen: Chem. Abs., vol. 38, col. 4943 (1944).

Bischoff: Beilstein (Handbuch, 4th ed.), vol. 12, page 547 (1929).